United States Patent
Colrain et al.

(10) Patent No.: US 9,262,490 B2
(45) Date of Patent: Feb. 16, 2016

(54) ADAPTIVELY ROUTING TRANSACTIONS TO SERVERS

(75) Inventors: Carol Lyndall Colrain, Redwood Shores, CA (US); Michael Ullrich Zoll, Foster City, CA (US); Vladimir Begun, Mountain View, CA (US); Rajkumar Arockia Irudayaraj, Mountain View, CA (US); Logan O'Sullivan Bruns, Napa, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 293 days.

(21) Appl. No.: 12/776,341

(22) Filed: May 7, 2010

(65) Prior Publication Data

US 2011/0276579 A1    Nov. 10, 2011

(51) Int. Cl.
G06F 17/30    (2006.01)
G06F 9/50     (2006.01)

(52) U.S. Cl.
CPC ........ G06F 17/30557 (2013.01); G06F 9/5011 (2013.01); G06F 9/5027 (2013.01); G06F 17/30914 (2013.01); G06F 17/30917 (2013.01); G06F 2212/7201 (2013.01)

(58) Field of Classification Search
CPC .................... Y10S 707/99931; Y10S 707/959; Y10S 707/99952; G06F 17/30595; G06F 17/30575; G06F 17/30569; G06F 17/30607; G06F 12/0802; G06F 12/0873; G06F 17/30917; G06F 17/30914; G06F 9/5011
USPC .......... 707/720, 737, 756, 770, E17.044, 966, 707/971, 972, 999.002; 711/161–163, 711/118–123, 126
See application file for complete search history.

(56) References Cited

U.S. PATENT DOCUMENTS 5,721,909 A * 2/1998 Oulid-Aissa et al. ................. 1/1
5,909,570 A * 6/1999 Webber ........................... 703/13
(Continued)

FOREIGN PATENT DOCUMENTS

GB     2459354     * 10/2009
WO   WO 98/44400   * 10/1998

OTHER PUBLICATIONS

U.S. Appl. No. 13/645,819, filed Oct. 5, 2012, Office Action, Dec. 3, 2013.
(Continued)

*Primary Examiner* — Srirama Channavajjala
(74) *Attorney, Agent, or Firm* — Hickman Palermo Becker Bingham LLP; Marcel K. Bingham

(57) ABSTRACT

A method and apparatus is provided for dynamically generating data to dataset mappings and dataset to logical instance mappings and distributing these mappings to subscribers for the purpose of routing work. An advisory engine updates the mappings of data to data sets based at least in part on changing demands and patterns of access to data, and updates the mappings of datasets to logical instances based at least in part on anticipated capacity and change in conditions of the database servers. The subscribers receive and store the mapping information that maps the data to dataset identifiers, and dataset identifiers to logical database instances. The subscribers may also receive information that describes the current availability conditions of database instances, which are used to override the mapping of logical database instances to physical database instances. Subscribers may use the data to dataset mapping to map data identified from in an incoming database request to a dataset. Subscribers may use the dataset to logical instance mapping to map a dataset to a possible database server, and the logical instance to physical instance mapping to map a possible database server to an available database server. In this manner, the subscribers may route data efficiently even when access patterns and server conditions change.

32 Claims, 5 Drawing Sheets

(56) References Cited

U.S. PATENT DOCUMENTS

| | | | |
|---|---|---|---|
| 6,134,549 A * | 10/2000 | Regnier et al. | 1/1 |
| 6,272,523 B1 * | 8/2001 | Factor | 709/201 |
| 6,310,883 B1 | 10/2001 | Mann et al. | |
| 6,826,753 B1 | 11/2004 | Dageville et al. | |
| 6,880,002 B2 * | 4/2005 | Hirschfeld et al. | 709/223 |
| 7,225,240 B1 * | 5/2007 | Fox et al. | 709/223 |
| 7,386,849 B2 | 6/2008 | Dageville et al. | |
| 7,493,400 B2 | 2/2009 | Loaiza et al. | |
| 7,702,676 B2 | 4/2010 | Brown et al. | |
| 7,805,407 B1 | 9/2010 | Verbeke et al. | |
| 7,809,690 B2 | 10/2010 | Pommerenk et al. | |
| 7,814,065 B2 | 10/2010 | Chan et al. | |
| 8,065,284 B2 | 11/2011 | Kaplan | |
| 8,117,488 B2 | 2/2012 | Chan et al. | |
| 8,271,468 B1 | 9/2012 | Peddy et al. | |
| 8,527,473 B1 | 9/2013 | Brown et al. | |
| 8,540,556 B2 | 9/2013 | Hiddink et al. | |
| 2001/0023476 A1 * | 9/2001 | Rosenzweig | 711/118 |
| 2002/0087798 A1 * | 7/2002 | Perincherry et al. | 711/133 |
| 2002/0116457 A1 * | 8/2002 | Eshleman et al. | 709/203 |
| 2002/0178276 A1 * | 11/2002 | McCartney et al. | 709/231 |
| 2003/0046270 A1 * | 3/2003 | Leung et al. | 707/1 |
| 2003/0081748 A1 | 5/2003 | Lipinski | |
| 2003/0204505 A1 * | 10/2003 | Cotner et al. | 707/10 |
| 2003/0210694 A1 * | 11/2003 | Jayaraman et al. | 370/392 |
| 2004/0030801 A1 | 2/2004 | Moran et al. | |
| 2004/0205310 A1 * | 10/2004 | Yamagami | 711/162 |
| 2004/0243647 A1 | 12/2004 | Oheda | |
| 2004/0249788 A1 | 12/2004 | Dant | |
| 2005/0097187 A1 * | 5/2005 | Thompson et al. | 709/217 |
| 2005/0114309 A1 * | 5/2005 | Dettinger et al. | 707/3 |
| 2005/0228822 A1 * | 10/2005 | Wason | 707/103 R |
| 2006/0031243 A1 * | 2/2006 | Boyle et al. | 707/102 |
| 2006/0036989 A1 * | 2/2006 | Chaudhuri et al. | 717/101 |
| 2006/0064478 A1 | 3/2006 | Sirkin | |
| 2006/0218123 A1 * | 9/2006 | Chowdhuri et al. | 707/2 |
| 2006/0242356 A1 * | 10/2006 | Mogi et al. | 711/100 |
| 2006/0265420 A1 | 11/2006 | Macnaughton et al. | |
| 2007/0005786 A1 * | 1/2007 | Kumar et al. | 709/230 |
| 2007/0022100 A1 * | 1/2007 | Kitsuregawa et al. | 707/3 |
| 2007/0073829 A1 * | 3/2007 | Volodarsky et al. | 709/217 |
| 2007/0245088 A1 * | 10/2007 | Mogi et al. | 711/120 |
| 2008/0162583 A1 | 7/2008 | Brown et al. | |
| 2009/0034537 A1 | 2/2009 | Colrain et al. | |
| 2009/0144338 A1 * | 6/2009 | Feng et al. | 707/201 |
| 2009/0182718 A1 | 7/2009 | Waclawik et al. | |
| 2009/0198736 A1 * | 8/2009 | Shen et al. | 707/200 |
| 2009/0216438 A1 * | 8/2009 | Shafer | 701/210 |
| 2010/0114870 A1 * | 5/2010 | Al-Omari et al. | 707/718 |
| 2010/0174863 A1 * | 7/2010 | Cooper et al. | 711/113 |
| 2011/0153826 A1 * | 6/2011 | Ananthanarayanan et al. | 709/226 |
| 2011/0191624 A1 * | 8/2011 | Rodgers et al. | 714/4.11 |
| 2011/0276579 A1 | 11/2011 | Colrain et al. | |
| 2012/0166483 A1 | 6/2012 | Choudhary et al. | |
| 2012/0173774 A1 | 7/2012 | Lee et al. | |
| 2014/0101100 A1 | 4/2014 | Hu et al. | |

OTHER PUBLICATIONS

U.S. Appl. No. 13/645,819, filed Oct. 5, 2012, Notice of Allowance, May 22, 2014.

* cited by examiner

ADAPTIVELY ROUTING TRANSACTIONS TO SERVERS

CROSS-REFERENCE TO RELATED APPLICATIONS

Fast Application Notification ("FAN") is mentioned as one technique for sending notifications of changes to node conditions. FAN is described in U.S. patent application Ser. No. 10/917,660, filed on Aug. 12, 2004, by Carol Colrain, entitled "Fast Application Notification in a Clustered Computing System," which is incorporated by reference herein in its entirety.

Various techniques for selecting a connection from a connection pool are described herein. One technique for selecting a connection from a connection pool is described in U.S. application Ser. No. 11/168,968, filed on Jun. 27, 2005, by Carol Colrain, et al., entitled "Connection Pool Use of Runtime Load Balancing Service Performance Advisories," which is incorporated by reference herein in its entirety.

FIELD OF THE INVENTION

The present invention relates to dynamically routing transactions to servers. Specifically, embodiments are described that promote data locality and accommodate for changing server conditions.

BACKGROUND

Database Servers

A database comprises data and metadata that is stored on one or more storage devices, such as a hard disk or a stick of random access memory. Such data and metadata may be stored in a database logically, for example, according to relational and/or object-relational database constructs. Database applications interact with a database server by submitting to the database server commands that cause the database server to perform operations on data stored in a database. A database command is a request to access data from a database. The command may perform operations on the data in the database or return the data from the database. Database commands may be in the form of a database statement. The database statements supplied to the database server are statements that conform to a database language supported by the database server. One non-limiting database language supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types.

In a multi-node database system, a single database may be served by multiple database servers, and each database server may be configured to access all or part of the database. A server is a combination of integrated software components and an allocation of computational resources, such as memory, a computing device, and processes on the computing device for executing the integrated software components on a processor. A "database server" is a server dedicated to performing a particular function to process requests to access a database. The term "database instance" may also be used to refer to a database server. Database servers may be grouped into logical domains called services. Multiple database servers may be installed on a single machine or on separate machines. When processing database commands, a database server may access the database or a cache of information from the database. In one example, the database is stored in non-volatile memory, and the cache is stored in volatile memory.

When multiple database servers share access to the same data, a database server may lock a portion of the database while the portion is in use by the database server. The database server then releases the lock when the database server is finished accessing that portion of the database.

Mid-Tier Servers

Mid-tier servers provide database server connections to users and applications that request information from a database. A mid-tier server is a server that provides access to one or more database servers, distributes work to one or more database servers, or manages connections to one or more database servers. Some examples of mid-tier servers include: TP monitors, job schedulers, application servers, connection concentrators, load balancers, batch schedulers, and message queuing systems. In one example, an application issues a request to a mid-tier server for data from a database. The mid-tier server selects a free connection from a connection pool of free connections to database servers. The mid-tier server sends the client request on the selected connection to a database server, and the database server accesses a database to handle the request. The database server processes the request by retrieving data from the database or by retrieving the data from the cache.

Mid-tier servers maintain connection pools, which include connections to database servers. A connection selected by a mid-tier server is one of the multiple connections to multiple database servers that are maintained in the connection pool. The connection may refer to either a physical mechanism, such as a physical port, or a logical configuration, or both. Often, there is a one-to-one mapping of logical connections (i.e., database sessions) to physical connections; however, there may be more than one logical connection associated with a single physical connection. In one example, the free connections in the connection pool include only those connections that are not allocated to users for processing requests for the mid-tier. As work completes, connections are returned to the connection pool and are available for subsequent users to borrow from the pool.

Typically, the mid-tier server distributes requests among the multiple database servers. A mid-tier server may distribute a large amount of requests from clients. Accordingly, mid-tier servers generally distribute individual requests quickly without consuming a large amount of resources.

One approach for choosing which free connection to use when routing a request involves selecting from among the free connections on a first-in-first-out (FIFO) basis, a last-in-first-out (LIFO) basis, or using a round-robin approach. In one example of a FIFO approach, requests are sent on the connection which has been available for the longest. The FIFO approach is sub-optimal because there is no consideration as to whether another database instance could more efficiently process the request. In one example of a LIFO approach, requests are sent on the connection that has been the busiest processing requests and has most recently become available. The LIFO approach is sub-optimal because it results in some database instances being starved of work. A round-robin approach aims to avoid starvation by cycling through the free requests. This approach likewise applies no consideration as to whether another database instance could more efficiently process the request.

Processing related requests can be expensive due to synchronization costs when using FIFO, LIFO or round-robin approaches. These approaches lead the requests to incur higher synchronization of data across the database than is needed if related data are routed together. For example, one database server may require synchronization data from another database server before being able to process a request for data that has been recently accessed or updated by the other database server. Processing a workload on the next available database server increases the synchronization cost incurred because multiple database servers compete for access to the same objects. This cost includes lock overhead when the multiple database servers contend for locks on resources required by the workload, block transfers across the cluster for sharing the data amongst the caches, and I/O for flushing redo associated with these blocks prior to sharing.

Another approach for distributing work across a clustered system involves routing the work according to manually customized database partitions. The database partitions are connected to database servers that are configured to serve the partitions. The partitioning approach requires specialized knowledge of the partitions by the application using the partitions. In this approach, if the application specifically identifies the partition for which the request is to be carried out, then the mid-tier may route the request to the set of database servers that are assigned to handle the partition based on a fixed routing table on the mid-tier. For shared databases, if the application does not identify the partition, then the mid-tier server routes the request according to other more random approaches such as the FIFO and LIFO approaches. For example, one or more database tables may be broken up into five partitions by a database administrator who manually customizes the partitions. Requests that identify the first partition are routed to a set of database servers that are configured to process the requests, according to a fixed routing table on the mid-tier server. If more than one database server is able to process the request, the database servers may be selected according to the FIFO approach or the LIFO approach. The use of partitions provides a better chance that requested information from the named partition will be cached on a database server because the database server processes a higher percentage of the information stored in the named partition. In other words, the use of partitions provides better data locality than in the more random FIFO and LIFO approaches. The better chance of data locality reduces the likelihood that instances will compete for data amongst each other.

However, one major disadvantage of physically allocating partitions to nodes is that it requires a system to be overbuilt in a custom manner and does not provide an optimal usage of resources at any given time as the workloads may be skewed to one partition or another. The physical partitioning approach routes requests according to the fixed routing table that stores static partition-to-database-server mappings specified by the database administrator. In order to specify the partition-to-database-server mappings, the database administrator needs to have a detailed knowledge of the system. As conditions change in the cluster, the mappings may no longer be efficient or effective. For example, if a database server fails or otherwise goes down, the data partitions in the database may need to be redistributed or completely redefined in light of the remaining database servers. Redistributing data partitions among database servers is time consuming and disruptive to the routing and execution of transactions in the database cluster, and such data redistribution may require a significant amount of manual intervention. Usage patterns for each partition may shift during the business period or at certain times of the year. In order to decrease the likelihood of redistribution, administrators may need to oversize the system using inflated load estimates to determine the amount of database server resources that may be needed to process peak amounts of requests for a partition. These inflated load estimates are wasteful of resources and may still require redistribution over time due to changing conditions in the database cluster. Even with inflated load estimates, the partitioning approach may still fail when usage patterns change from the usage patterns that were originally expected when the partitions were created.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
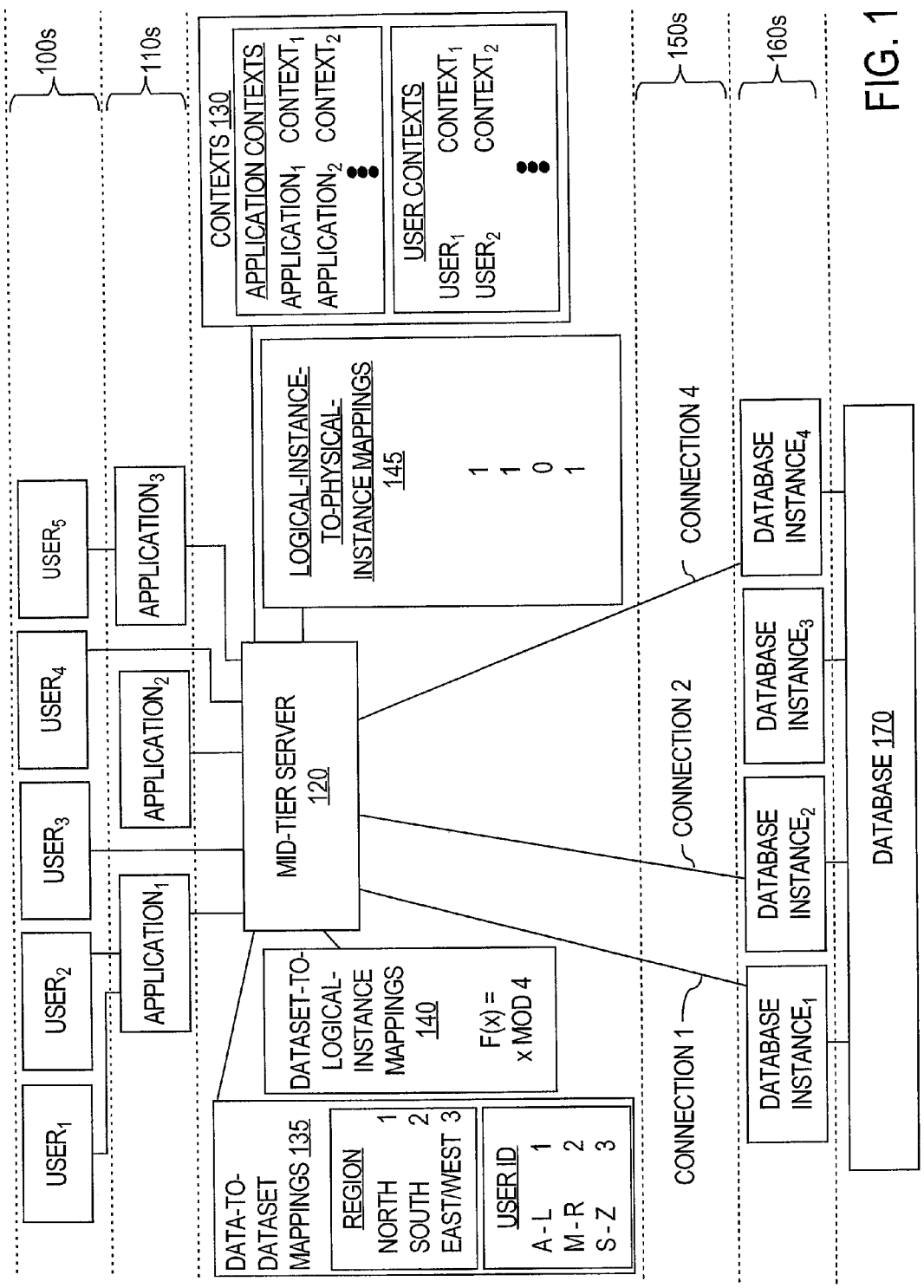
FIG. 1 is a diagram illustrating one system in which a request is dynamically routed to a database instance based on a data-to-dataset mapping, a dataset-to-logical-instance mapping, and a logical-instance-to-physical-instance mapping.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for dynamically generating data-to-dataset mappings to be used by mid-tier servers for dynamically and adaptively routing transactions. In one embodiment, the data-to-dataset mappings are automatically generated based on information that describes a demand for data or a change to a pattern of data access. For example, a data-to-dataset mapping may be updated in response to statistics that indicate an increase or decrease in the frequency in which data from a particular dataset is accessed in same database sessions. In one embodiment, a change in a frequency in which data from a dataset is concurrently accessed in the same session triggers a re-mapping of data to datasets. Optionally, the re-mapping may be triggered when the statistical information satisfies a threshold value such as a threshold frequency of concurrent access. In another embodiment, the re-mapping may also be triggered by a demand for data from a dataset, for example, a demand that exceeds a capacity of any one server. In one embodiment, the re-mapping of data to datasets may include restructuring an existing data-to-dataset mapping to group data frequently accessed in same sessions into same datasets. A data-to-dataset mapping may map a data key from data to a dataset. The data-to-dataset mapping may also indicate a rank order or a relative weight to give to data items that map to datasets, based on the likelihood of achieving an advantage from affinity-based routing by mapping the data item to a particular dataset. In this manner, an optimal mapping may be applied to a given request that that includes data from multiple datasets.

Techniques are also provided for dynamically generating dataset-to-logical-database-server mappings to be used by mid-tier servers for dynamically and adaptively routing transactions. A logical database server represents a soft-coded mapping to a physical database server. The soft-coded mapping allows transactions to be routed to other physical database servers if a preferred physical database server is associated with unsatisfactory conditions. In one embodiment, the dataset-to-logical-database-server mappings are automatically generated based on characteristics or conditions of physical database servers. For example, a dataset-to-logical-database-server mapping may be updated in response to a notification that a particular database server is up or down. In various embodiments, an advisory engine updates dataset-to-logical-database-server mappings based on conditions that include a response time, a load, availability, a cache miss rate, or a cache hit rate of physical database servers. In various other embodiments, the advisory engine updates the mappings based on characteristics that include processor speed or amount of memory of the physical database servers. Optionally, a re-mapping of datasets to logical database servers may be triggered when the conditions or characteristics satisfy a threshold value. For example, the threshold may be satisfied when a database server has a response time above 10 ms, or when a database server goes offline or comes online. In one embodiment, the remapping of datasets to logical database servers involves restructuring an existing dataset-to-logical-database-server mapping to balance load across a plurality of physical database servers.

Techniques are also provided for dynamically and adaptively routing transactions to servers in a manner that promotes data locality and accounts for changing conditions among the servers such as the state of the servers, the load of the servers, and the response time of the servers, or characteristics of the servers such as a processor speed or a memory capacity of the servers. The mid-tier server may use the dataset-to-logical-database-server mappings that are updated based on newly discovered conditions or characteristics. The transactions are dynamically routed in a consistent manner that avoids servers associated with unsatisfactory conditions, such as servers that are down or offline, heavily loaded, or slow to respond. In the same or a different embodiment, the dynamic and adaptive routing by the mid-tier server accounts for a change to a pattern of data access or a demand for data by using data-to-dataset mappings that are updated based on newly discovered statistics about the data.

Under the same or similar server conditions and data access patterns, requests associated with the same dataset are mapped to the same physical database server. In this manner, the routing techniques described herein may be called "affinity-based routing" because particular physical servers have a soft-coded affinity for particular datasets. Dynamically routing transactions to promote data locality leads to a better cache hit ratio and lower data access times. Also, processing requests for related data on a single server reduces the synchronization cost otherwise incurred when multiple servers contend for shared resources.

Techniques are described for dynamically generating data-to-dataset mappings and dataset-to-logical-instance mappings and distributing these mappings to subscribers for the purpose of routing work. In one embodiment, an advisory engine updates the mappings of data to data sets based at least in part on changing demands and patterns of access to data, and updates the mappings of datasets to logical instances based at least in part on anticipated capacity and change in conditions of the database servers. The subscribers receive and store the mapping information that maps the data to dataset identifiers, and dataset identifiers to logical database instances. The subscribers may also receive advice relating to the current availability conditions of a database instance. Subscribers may use the data to dataset mapping to map data identified from in an incoming database request to a dataset. Subscribers may use the dataset to logical instance mapping to map a dataset to a possible database server, and the logical instance to physical instance mapping to map a possible database server to an available database server. In this manner, the subscribers may route data efficiently even when access patterns and server conditions change.

In one embodiment, data to dataset mappings are created by an advisory engine that determines which sets of data that are often accessed together by the same request or in the same database session. In other words, the advisory engine determines which data benefits from co-located access in the same database cache. For example, the advisory engine may determine that subsets of the data are frequently accessed together. The decision to group data into dataset is made to improve the response time for that data by eliminating cross node synchronization costs. The decision to split datasets is based on an inability of any instance to serve that entire dataset with good performance compared to the extra costs of synchronization. The mapping decisions are dynamic and published by an advisory engine. The mappings may align with a physical partitioning scheme, further reducing the response times due to the separation of work. Unlike shared-nothing systems however, there is no requirement to physically partition data. Whether or not the data is physically partitioned, the advisory engine may advise data to dataset mappings at a first level and dataset to instance mappings at a second level. The dataset to instance mappings at the second level account for current or last known conditions of physical instances by mapping the dataset to a logical instance before mapping the logical instance to a physical instance.

Based on updated data-to-dataset mappings, dataset-to-logical-instance mappings, and logical-instance-to-physical-instance mappings, mid-tier servers may adaptively route transactions to database servers in a manner that accounts for changing access patterns and server conditions. The database servers discussed herein may process any type of request for any type of data. For example, the teachings provided herein may be used to adaptively route transactions in a reader farm environment, to accommodate read-only requests for data. The teachings provided herein may be used to adaptively route transactions in a replicated database environment, to accommodate requests for data that is replicated on multiple databases. Further, the teachings provided herein may be used to adaptively route transactions in a clustered database environment, to accommodate requests for data from a shared database.

In one embodiment, each database server is capable of accessing the database to process the request, such as in a shared everything clustered database system. The mid-tier server selects a database server to process the request based in part on a mapping of data to datasets, a mapping of datasets to logical instances, and a mapping of logical instances to physical instances.

Consistent with the techniques described herein, the mid-tier server may dynamically select a server when routing a transaction in any manner that is based at least in part on a dynamic mapping of data to datasets and/or a dynamic mapping of datasets to servers. In one embodiment, the dynamic mapping of datasets to servers is based on a mapping of datasets to possible servers and a mapping of possible servers to available servers based at least in part on current or last known server conditions.

Dynamically Generating the Mappings

The advisory engine receives updates on the status of services or other notifications of database server conditions. For example, the advisory engine may receive a notification that a particular service is "UP" or "DOWN," and the database servers for which the service is UP or DOWN. As another example, the advisory engine receives information that indicates one or more resources supporting a particular database server is loaded (i.e., busy or in use). In a specific example, a database server sends information to the advisory engine that indicates that a resource, such as a processor or memory, supporting one or more services or one or more database servers is used to a certain degree or percentage. For example, the database server may notify the advisory engine that the processor executing commands from the database server is 75% busy processing requests. In another specific example, the database server may notify the advisory engine that an amount of memory allocated to the database server is 80% used. In another embodiment, the database server may provide characteristics, such as a total amount of configured memory or processor speed, to the advisory engine. The information may also include response times of the database server and/or a cache hit rate of the database server. This information may be used to update the dataset-to-logical-instance mapping and/or the logical-instance-to-physical-instance mapping. In one embodiment, the logical-instance-to-physical-instance mapping is maintained on the mid-tier based on current or last known server conditions.

The mid-tier server selects a connection to a database server based on the mappings provided by the advisory engine. The advisory engine sends updated mappings to the mid-tier server in response to changing conditions of servers, changing statistics associated with resource usage, and/or changing statistics associated with data usage.

In yet another embodiment, the advisory provides information to the mid-tier server to indicate that, for certain datasets, there is no affinity advantage. In response to determining that the request is associated with a dataset with no affinity advantage, the mid-tier uses runtime load balancing advice (e.g., a 75% and 25% distribution) to share work amongst database servers. The advisory for balancing load from the mid-tier may give database servers with low loads (i.e., underused database servers) a higher weight than database servers with high loads (i.e., overused database servers). The mappings that are used for affinity-based selection of database servers may vary from service to service and from dataset to dataset. In one embodiment, the mappings are provided on a dataset-by-dataset basis. In another embodiment, the same procedure is used for every dataset. Advantageously, every mid-tier server in the system may use the same mappings from the advisory engine. Accordingly, every mid-tier server takes the same action under the same conditions so that accesses to the dataset have the same pattern regardless of the mid-tier server routing the transaction. The techniques provided for selecting database servers are non-limiting examples.

Defining Datasets

In one embodiment, mid-tier servers receive a mapping or a set of dataset definitions that maps data values, data objects, or data keys to a dataset. For example, a particular user of a plurality of users is mapped to a particular dataset of a plurality of datasets. Specific examples of mapping data to datasets are provided in order to facilitate a better understanding of specific implementations. However, the techniques described herein are not limited to any particular technique for mapping data to datasets, and a person of ordinary skill would understand that there are infinitely many ways for grouping data into sets.

In one embodiment, the datasets are identified by dataset identifiers that map to the datasets. The dataset identifier by itself does not indicate which database server is presently processing requests for the dataset. The dynamic mapping of dataset identifier to database server occurs at a second level and third level of routing, and the dynamic mapping is generated based in part on the conditions of one or more database servers. The dataset identifier by itself also does not indicate the current state of any database servers. In one embodiment, the set of dataset identifiers is stored in the cache of the mid-tier server based on dataset selections from a user such as an application developer, an administrator of the mid-tier server, or an application user. As an example, the application developer may determine that requests from an online banking application may be separated for affinity-based routing based on the bank branch, the area code of the bank, and/or the geographic region in which the bank is located. In one embodiment shown in dataset definitions 135 of FIG. 1, the geographic region data for a bank may be one of "NORTH," "SOUTH," "EAST," or "WEST." The regions may be broken up into datasets defined as "NORTH," "SOUTH," and "EAST/WEST," as shown. In the example, each dataset may have one or more values of data. The "EAST/WEST" dataset is defined to have two values, "EAST" and "WEST."

In one embodiment, the datasets may be identified by the values in the datasets. For example, the dataset that includes the "NORTH" value may be identified by the "NORTH" value itself. In another embodiment, the datasets may be identified by some other value that provides input for the dynamic dataset-to-server mapping function for dynamically selecting database servers. For example, the routing procedure may expect to receive integers as shown in the region portion of dataset definitions 135, or characters as shown in the user ID portion of dataset definitions 135. As shown in the region portion, "NORTH" is identified as dataset "1," "SOUTH" is identified as dataset "2," and "EAST/WEST" is identified as dataset "3."

In one embodiment, the database uses a partitioning scheme to partition tables in the database. Partitioning schemes may partition a table based on data ranges, hash algorithms, lists of values, and composite schemes comprising several levels such as range/hash within each range. The partitioning scheme used at the database can be replicated on the mid-tier servers. Replication of the partitioning scheme at the mid-tier servers allows user requests using a data value to be mapped to the partition for that data value. In other words, the partitions, which may be automatically maintained in the database, may define the datasets at the mid-tier server. The mapping of partitions to database servers is completely dynamic and is published from the advisory engine to the mid-tier servers.

In another embodiment, an application developer, a database administrator, or another user separates user identifiers or other fields into datasets for affinity-based routing. The datasets may or may not include all of the user identifiers for a particular application. It may be advantageous for some of the data but not other data to be used for affinity-based routing. In one embodiment, the datasets for user identifiers may include specific user identifiers that have been selected to be used for affinity-based routing. For example, user identifier values such as "Candice," "Michael," "Jane," "Jack," and "Victor" may be included in the datasets, but other user identifier values such as "Administrator" and "Guest" may not be included if they are not useful for identifying datasets to be used for affinity-based routing.

In another embodiment shown, ranges of user identifiers may be used for affinity-based routing. For example, "A-L" is a first dataset, "M-R" is a second dataset, and "S-Z" is a third dataset. User identifiers falling into the "A-L" dataset may be those identifiers that start with "A-L," such as "Candice." The values chosen for the dataset identifiers may or may not be related to the values in the datasets. In the example, the ranges of data in dataset definitions 135 are identified as range "1," range "2," and range "3." Other logical identifiers may be used, such as "A," "M," and "S," not shown.

The datasets and dataset identifiers may be updated quickly and easily on the mid-tier without changes to the database. In one embodiment where partitions are used, the database and the mid-tier are synchronized based on the same datasets. In one embodiment, a system has multiple mid-tier servers connected to multiple database servers. In order to promote data locality on the database servers, each mid-tier server should use the same dataset definitions and the same mappings for making dynamic routing decisions for requests associated with the datasets. An update to the dynamic data-to-dataset mappings or the dynamic dataset-to-database-server mappings on the advisory engine may trigger an update to these mappings on all of the mid-tier servers or a certain set of mid-tier servers. In a specific embodiment, rolling updates are performed on the mappings of the mid-tier servers. A rolling update may be performed by updating a first set of mid-tier servers before updating a second set of mid-tier servers. After the first set of mid-tier servers is updated and before the second set of mid-tier servers is updated, transactions may not be routed consistently by the two sets of mid-tier servers even under the same conditions. After all sets of mid-tier servers have been updated, to promote data locality, the mid-tier servers route transactions in a consistent manner under the same conditions.

Using an alternate method, the new mapping function is deployed to all mid-tiers carrying a newer version number. Once the mapping function has been installed at all servers, the version of use for routing requests is updated at all mid-tiers. Previously allocated requests continue to use the older versions. Incoming requests use the new version.

If a dataset is defined to contain a large amount of data, encompassing a large amount of requests, then the demand associated with the dataset may be more than any one database server can handle. Accordingly, larger datasets may be routed to a second database server as a first database server becomes busy processing requests, and to a third database server as the second database server becomes busy processing requests. An affinity advisory engine indicates when the currently used mappings should be further partitioned or deleted. The same advice is published to all mid-tier subscribers to ensure consistent behavior. The affinity advisory is automatic and may be triggered when service response times are unbalanced, when the demand on data sets exceeds the capacity of any one server to deliver good response times, when some servers are under utilized, or when a percentage of cache misses reaches or exceeds a threshold, by way of examples.

Smaller datasets of logically related information are more beneficial to affinity-based routing because there is more flexibility allocating the datasets to database servers in order to achieve predictable response times. If one database server shows excessive load, a subset of the datasets may be reallocated to other servers based on expected demand. Likewise, if some servers are under used, and response times are expected to improve smaller data sets allow a gradual redistribution of work. When using small datasets, the advisory may recommend that some data sets be routed together for affinity reasons.

In one embodiment, the mapping of datasets to servers is based on the amount of volatile memory available in the database servers and expected demand to these data sets. For example, the data set to server mapping may be selected so that one or more data sets can be expected to fit within the volatile memory of one or more database servers. In one embodiment, the affinity advisory engine determines the dataset definitions and dynamic routing procedures to use for a service, and the affinity advisory engine publishes this information to all mid-tier subscribers. The dataset definitions and dynamic routing procedures may change on the fly by the advisory engine as usage patterns and availability of physical resources change. In one embodiment, the dataset size is configured so that the number of datasets is greater than the number of database servers. This provides flexibility for the advisory engine to balance load based on demands.

Datasets that are too small may fail to take advantage of all of the benefits of affinity-based routing. Defining datasets into sizes that are too small may cause logically related data fall into different datasets and to be routed to different database servers. Too often work requests may fall across several data sets. Therefore, datasets should be small to the extent that the datasets still have good coverage of logically related information for the values or objects in the datasets. The selected datasets should be logically related, or commonly occurring in the same request, in order to gain the most benefit from affinity-based routing. If there are n partitions of a column, and the requests often touch several of the partitions, then routing with an affinity for the partitions may not provide a significant benefit. By way of example, if a typical request involves a user moving an item from one place to another, and both 'places' belong to that user, then it may be better to have an affinity by user and not by place.

In one embodiment, the data-to-dataset mapping also includes a rank order of preference for which mappings of dataset identifiers to datasets should be used. In the 'user,' 'place' example above, the mapping of data to a user may be more valuable for affinity-based routing and may receive a higher ranking or weight.

Dynamically Mapping Requests to Datasets

The mid-tier receives requests from clients such as users or other applications. The mid-tier server maps a particular request to one or more datasets by using a cache of data-to-dataset mappings that are, for example, set by an administrator, defined by a data partitioning scheme, and/or received from the advisory engine. In one embodiment, data associated with a user request is mapped to a particular dataset. The techniques described herein are not limited to any particular technique for mapping requests to datasets, and a person of ordinary skill would understand that there are infinitely many ways for mapping one set of information to another set of information. Specific examples of mapping data to datasets are provided in order to facilitate a better understanding of specific implementations.

In one embodiment, the mid-tier server maps a request to a dataset based at least in part on a data-to-dataset mapping. The request may be mapped to any dataset touched by or associated with the request. In one embodiment, the client requests may include information that fits within datasets that are identified in a cache of the mid-tier server. In another embodiment, the client request may be associated with information that fits within the one or more datasets. For example, the mid-tier server may determine that the request is for data from within a range of data. In another example, the mid-tier server may determine that the request is for data associated with a set of values. In another example, the mid-tier server may determine that the request is for data from a particular partition. The mid-tier server may identify the dataset based on any information associated with the request. In one example, a request to access data from a particular dataset is mapped to a dataset identifier for the particular dataset. In a particular embodiment, the request is associated with a context, and the context includes information that fits within the one or more datasets or otherwise identifies the one or more datasets.

In one embodiment, "data keys" are used at the mid-tier for determining a dataset to which a request is associated. Prior application programming interfaces (APIs) to checkout a connection have no provision to pass a piece of data associated with that request. In one embodiment, the application writes the data key that it is interested in to a context area prior to making a checkout request. The connection pool reads the data key from this context area when executing the subsequent checkout call. In another embodiment, the API to checkout a request is extended to include data keys of interest to that request. In another embodiment, at connection checkout, the mid-tier server scans the request looking for data keys and uses those that it locates in a rank order for the mapping to datasets. In yet another embodiment, at connection checkout, the mid-tier server accesses a property of the request such as a network domain or a client identifier, and the mid-tier server uses this property as a distinguishing key for routing the request. For example, the request may be associated with a particular user identifier. Data keys include any keys that may be associated with the request and have been identified as good candidates for affinity-based routing.

In one embodiment, the datasets are identified based on a data-to-dataset mapping that is generated for the database and sent from an advisory engine to the mid-tier server. In one embodiment, an advisory engine on the database server generates the data-to-dataset mapping automatically in response changes in data access statistics and/or resource usage statistics. In another embodiment, the datasets are identified based on a custom data-to-dataset mapping that is specified by a user, an application, or a database administrator.

In one embodiment, the mid-tier server determines that a user identifier is associated with the request. The user identifier belongs to a set of user identifiers to be used for affinity-based routing. In a specific example, the set of user identifiers defines a range of user identifiers such as "M-R." The mid-tier server determines that the request is associated with the M-R dataset and forwards requests for the M-R dataset to the same database server as long as the conditions of the database servers remain the same or similar. A change in conditions may cause requests for the M-R dataset to be routed to another database server. In another example, the set of user identifiers is a particular user identifier or group of user identifiers such as "administrator," and the mid-tier server determines that the request is associated with the administrator dataset and forwards requests for this dataset to the same database server while the conditions of the database servers remain the same or similar. For example, requests associated with the administrator dataset are forwarded to the same database server while that server is available and is associated with satisfactory conditions.

In one embodiment, the client requests may include information that fits within one or more datasets. For example, the request may be a query for data from the "WEST" branch. The mid-tier server detects that the query is for data from the "WEST" branch, and the mid-tier server identifies the "EAST/WEST" dataset as including the "WEST" branch detected in the request. A connection to a database server is selected based in part on the identified "EAST/WEST" dataset. In a specific example, an ATM machine uses an application that includes bank branch information with requests. In another example, multiple datasets may be detected as datasets that are associated with the request.

The data to be used for mapping data to datasets may be any data associated with the request that fits in one of the identified datasets. In an email application, the user may be associated with a user identifier when the user logs in to access an email account. The user identifier is detected in association with requests from the user, and the request is routed according to a dataset that includes the user identifier. In an online bill payment application, the user may be associated with an account identifier when the user logs in to access the account. The account identifier is located when the request is received from the user, and the request is routed according to the account identifier. In an online retail application, the data for affinity-based routing may be a shopping cart identifier or data representing a particular item or item type in the shopping cart, such as "jewelry," "clothing," or "sports equipment."

In another embodiment, the request may be associated with context information that is stored on the mid-tier server or on the database server in association with a database session or a lightweight application or user session. The mid-tier server determines that the context information fits within a dataset. For example, the request may be associated with an application context and/or a user context. In a specific example, a user opens a session with an application such as a Web application. Requests from the user become associated with a user context when the user is authenticated. Then, the user issues operations that are, for example, against a set of records for the user account. The mid-tier server detects that the user context for the request includes information, such as a user identifier, that fits in the dataset identified as the "M-R" dataset. A connection to a database server is selected based in part on the identified "M-R" dataset.

In yet another embodiment, the request is associated with any mapping of data to datasets that has been published by an advisory engine. For example, when a database server uses or changes a partitioning scheme, the database server sends data-to-dataset mappings associated with the partitioning scheme to the mid-tier, and the mid-tier caches these mappings. In another embodiment, the advisory engine detects changes in patterns of access, creates datasets based on these patterns of access, and then publishes these to the mid-tier servers. Accordingly, requests that are statistically likely to occur together may be routed to and processed by the same database server.

In one implementation, the mid-tier server may run a callback function as the request reaches the connection pool. The callback function accesses the dataset identifiers, such as dataset identifiers stored in the cache for mapping data to datasets, and returns a particular dataset identifier to the connection pool. The mid-tier server uses the dynamic dataset-to-server mappings received from the advisory engine to map the dataset to a database server associated with satisfactory conditions. In the same or another implementation, the callback function may not return any dataset identifiers if data from the request does not fall in any of the identified datasets.

A partition is a special class of dataset. When the database is partitioned, the partitioning algorithm is used to determine datasets (in this case, matching the same physical partitioning as used at the database). The advisory engine sends data-to-dataset mapping information to the mid-tier server. The mid-tier server receives requests for data that fits a mapping that was generated based on the partitioning algorithm. The requests for data are categorized into the mappings that were automatically generated by the database server. The requests may be processed according to the techniques described herein in a manner that is opaque with respect to the application and the user or administrator. In other words, dynamic routing that promotes data locality may be achieved by the mid-tier server without manual modification of the data-to-dataset mappings by the application, user, or administrator.

Dynamic Mapping of Dataset to Database Server

In one embodiment, a dataset associated with the request is dynamically mapped to a database server based, at least in part, on a dataset-to-logical-database-server mapping and a logical-database-server-to-physical-database-server mapping. In one embodiment, the logical-database-server-to-physical-database-server mapping accounts for one or more current or last known conditions of one or more database servers. Requests associated with a particular dataset are mapped to a logical database server based on a mapping of datasets to potential database servers. The selected logical database server is then re-mapped to a physical database server that is available to process the request. For example, a request is mapped to a dataset, which is mapped to a first database server unless the last known or current condition of the first database server indicates that the first database server is unable to efficiently process requests. If the condition indicates that the first database server is unable to efficiently process requests (i.e., is unavailable and/or has poor response times), the mid-tier server dynamically re-maps the request to a second database server associated with last known conditions that indicate that the second database server is able to efficiently process requests (i.e., is available and/or has good response times). The mid-tier server consistently selects the same database server for the same dataset when the server conditions and the data access statistics remain the same or similar. The mid-tier server selects another database server when the server conditions change, when the data access statistics change, or when the dataset identified from the request changes. In this manner, the data-to-dataset mapping, the dataset-to-logical-database-server mapping, and the current or last known server conditions (a logical-database-server-to-physical-database-server mapping), along with the dataset provide complete mapping information that may be used to determine a selected database server in a manner that is not dependent upon the order in which database servers became available, and in a manner that is not static when conditions of the database servers change.

In one embodiment, the dataset-to-logical-database-instance and the logical-database-instance-to-physical-database-instance mapping are part of a dynamic dataset-to-database-server mapping. In one example, the dynamic dataset-to-database-server mapping is based on a stored mapping function that first maps the dataset to a first possible database server and then re-maps the dataset to a second database server if the first database server cannot process the request. The mapping function deterministically provides a selected possible database server to process requests for the dataset. If the selected possible database server is associated with unacceptable conditions, then the mapping function deterministically provides a next selected possible database server. Further, database servers known to have unacceptable conditions may be excluded from possible selection by the stored function. In one example, the function maps a first request associated with a dataset to a first database server under certain conditions. The function consistently maps a second request associated with the same dataset to the same database server if the conditions remain the same or similar. If the conditions change, the second request may be dynamically and deterministically re-mapped to a second database server before the request is routed. The mapping of datasets to database servers is dynamic in that it depends on both (a) the last known or current conditions of one or more database servers, and (b) an order of preference of possible database servers specified by the stored dataset-to-logical-database-server mapping function.

In one embodiment, a data affinity advisory engine calculates a mapping of datasets to database servers based at least in part on current or last known conditions of one or more database servers and stored functions for mapping a dataset to a logical instance and the logical instance to an available physical instance. The mapping from the advisory engine is published to each mid-tier server. The mid-tier servers use the mapping dynamically calculated by the advisory engine in order to route transactions. If the advisory engine publishes a mapping that maps a dataset to a database server that goes down, the mid-tier server may use a default routing scheme to route the transaction until an update is received from the advisory engine. For example, the mid-tier server may route the transaction according to runtime load balancing.

Server conditions change over time based on load changes, equipment efficiency, maintenance, and other factors. Server conditions include any condition of a database server or any resource associated with a database server. The techniques described herein are not limited to any particular technique for receiving notifications of server conditions or for making determinations based on the server conditions. Specific examples of server conditions and notifications are provided in order to facilitate a better understanding of specific implementations.

Database server conditions that change over time may include, for example: (1) a change in availability conditions such as a "down" change, an "up" change, a "not restarting" change, and/or a "starting" change, and (2) a change in load conditions, performance metrics, or performance statistics such as a "busy" change, a "not busy" change, a change in a percentage of a resource being used, and/or a change in the response time of a database server, and/or (3) any other change associated with the condition of the database server. Availability conditions and load conditions may be considered performance characteristics because they provide information about how capable the database server is of processing a request. Notifications of the example conditions above are provided in response to a change in a node condition on a database server. For example, a down change occurs when a database instance terminates, or "goes down." An up change occurs when a database instance initializes, or "comes up." A "not restarting" change occurs when a database instance can no longer start. A "busy" change occurs when a resource associated with the database instance becomes used beyond a threshold amount. A "not busy" change occurs when a resource associated with the database instance becomes unused beyond a threshold amount. In another embodiment, the actual percentage of the resource being used or the actual response time may be sent periodically in notification messages.

Other characteristics of physical database servers may also be useful for mapping datasets to logical database servers. For example, the processor speed or configured amount of memory for a physical server may be useful in determining how much work should be routed to that physical server. In other words, a dataset that is frequently accessed may be handled by a physical server with good operating or performance characteristics.

In one embodiment, transactions are routed according to a dynamic dataset-to-server mapping that would map transactions for a dataset to a first database server if the first database server was last known to be associated with a satisfactory condition, and to a second database server if the first database server was last known to be associated with an unsatisfactory condition and the second database server is associated with a satisfactory condition. At a given time, the mapping reflects that the first database server is down and the second database server is up. Accordingly, transactions for the dataset are routed to the second database server. At a later time, the first database server comes back up. In response to receiving an updated condition of the first database server, the mappings are updated on the mid-tier servers so that transactions for the dataset are routed to the first database server.

The techniques described herein are not limited to any particular method of receiving updates of database server conditions. In one embodiment, an agent for a database server sends condition updates to the mid-tier server and/or to an advisory engine whenever the condition of the database server changes. In another embodiment, the agent sends condition updates periodically regardless of whether the condition of the database server changes. In yet another embodiment, the agent sends condition updates when condition updates are requested.

Fast Application Notification ("FAN") is one technique that may be used or modified to notify the mid-tier server when a database server condition changes. FAN is described in U.S. patent application Ser. No. 10/917,660, filed Aug. 12, 2004 by Carol Colrain, which has been incorporated by reference herein in its entirety. Using FAN, when a resource associated with a service experiences a change in condition, a notification event is immediately published. An advisory engine subscribes to the notification events and receives the notification of the change in condition.

In one embodiment, the mid-tier server receives notifications that map datasets to database servers. In another embodiment, the mid-tier server or an advisory engine on the mid-tier server builds its own mapping of datasets to database servers in cache or memory based on notifications of node conditions.

In one embodiment, an advisory engine stores a bitmap where each bit represents each dataset supported by the service. The mid-tier server assigns a "1" to the database server if the database server is up or associated with satisfactory conditions and a "0" to the database server if the database server is down or associated with unsatisfactory conditions. The bitmap provides for rapid hashing of datasets to available database servers. In another embodiment, the mid-tier server may associate other information with the database server such as the runtime load balancing advice to balance the distribution of datasets to database servers. The runtime load balancing advice is used in the absence of an advisory from the advisory engine as to the preferred dataset to database server mapping.

In one embodiment, the advisory engine publishes the dynamic dataset-to-server mapping to the mid-tier server, and the mid-tier server maintains the dynamic mapping in memory. For example, the mid-tier server stores a bitmap where each bit represents a node. In the bitmap, a "1" is stored for the nodes last known to be up, and a "0" is stored for the nodes last known to be down. In another example, the advisory engine may associate other information with the node such as the load of one or more resources associated with the node or the response time of the node.

Dynamically Routing Requests to Servers

The data-to-dataset, dataset-to-logical-server, and logical-server-to-physical-server mappings direct the mid-tier server to route transactions for like data, or transactions mapped to the same dataset, to the same database server as long as the database server is associated with satisfactory conditions. Specific examples of mapping datasets to database servers are provided in order to facilitate a better understanding of specific implementations. However, the techniques described herein are not limited to any particular technique for mapping datasets to database servers, and a person of ordinary skill would understand that there are infinitely many ways for mapping one set of information to another set of information.

For example, transactions associated with the "EAST/WEST" region may be routed consistently to, or mapped to, the second database server. The dynamic mappings of datasets to database servers are generated based at least in part on conditions. For example, one mapping is configured to avoid nodes that are DOWN or nodes that are BUSY above a level of 90%. In one embodiment, the mappings consistently and reliably routes transactions for same datasets to the same database servers as long as the database servers are under satisfactory conditions that are, for example, specified by the procedure. In one example, the advisory engine may exclude certain database servers from the mapping based on notifications received about the conditions of the database servers.

When there are no free connections at the database server identified for a request, optionally, the mid-tier server attempts to create a connection to a selected database server. In one embodiment, the connection is created only if the number of connections in the pool and the number of connections to the database server are not maximum amounts. In one embodiment, the mid-tier server redistributes the request according to a default routing procedure, for example using runtime load balancing, when the dynamic selection technique results in selection of an invalid database server as the result of a time-out or another error.

There are numerous ways in which the dynamic mapping of datasets to database servers may route requests based on the dataset identifier in a manner that takes into account one or more last known conditions of one or more database servers. A given request may be associated with one or more datasets, and one or a combination of the data-to-dataset mappings may be used in conjunction with one or a combination of the dynamic dataset-to-server mappings in order to identify a best server for processing the request. Alternately, only a selected one dataset is used for the mapping.

For a given request, one or more of dataset-to-logical-database-server mappings may be used. In one embodiment, the same dataset-to-server mapping is used for every dataset. In another embodiment, the dataset-to-server mapping may be selected based on the dataset or datasets to which the request is associated. For example, a mapping based on user identifier may be selected for a request that touches on user information; whereas, a mapping based on region may be selected for a request that does not touch on user information. The techniques provided for selecting nodes are non-limiting examples. The mid-tier may select a database server based on any technique that uses the dataset associated with the request and a mapping that is based on the last known conditions associated with one or more database servers.

An example system used for affinity-based routing is illustrated in FIG. 1. As shown, users 100s and applications 110s connect to a mid-tier server 120 for sending requests to access a database 170. As an example, mid-tier server 120 receives a request from APPLICATION$_1$ in order to provide information to USER$_1$. In one embodiment, the mid-tier server 120 associates the request with a context from contexts 130. As shown, the request may be associated with an application context or a user context. In one example, the user may be associated with a user session that has a user context. The user context may include any information about the session that has been set up for the user. As shown, USER$_1$ is associated with CONTEXT$_1$, which may include a user identifier or other information associated with USER$_1$.

The user identifier for USER$_1$ is detected by mid-tier server 120 as data that is to be used for affinity-based routing. Mid-tier server 120 determines where and whether the user identifier for USER$_1$ fits within the user ID data-to-dataset mappings 135. For example, the user identifier for USER$_1$ is "Victor," which fits in the "S-Z" dataset. As shown, the "S-Z" dataset is identified as dataset 3.

Based on dataset identifier 3, dataset-to-logical-instance mappings 140 are configured to suggest possible INSTANCE$_3$. Logical-instance-to-physical-instance mappings 145 are configured to change the suggested possible INSTANCE$_3$ to INSTANCE$_4$ because INSTANCE$_3$ has been associated with an unsatisfactory condition, as indicated by the "0" in the third position of the mappings. In another embodiment, logical-instance-to-physical-instance mappings 145 change suggested the suggested possible instance to some other instance based on a deterministic function. In one embodiment, the range of the deterministic function covers all potential instances.

In FIG. 1, the dataset-to-logical-instance mapping example is "F(x)=x MOD 4." It is to be understood that this example is merely one embodiment of a dataset-to-logical-instance mapping. Any mapping of datasets to logical instances may be used. In another embodiment, the dataset-to-logical-instance mapping is made using a bucket algorithm with a percentage allocation of datasets to buckets based on runtime load balancing advice, or using a dataset to server mapping created by the advisory engine based on an expected demand for a dataset.

Mid-tier server 120 sends the request on connection 4 of connections 150s to database instance 4, where the request is processed. In one example, database instance D accesses a physical disk in order to process the request against database 170. In another embodiment, database instance D has the relevant data cached and does not need to access a physical disk to process the request. In one example, a result is returned on connection D to mid-tier server 120, and mid-tier server 120 distributes the result to APPLICATION$_1$, which displays the result to USER$_1$.

Figure 2:
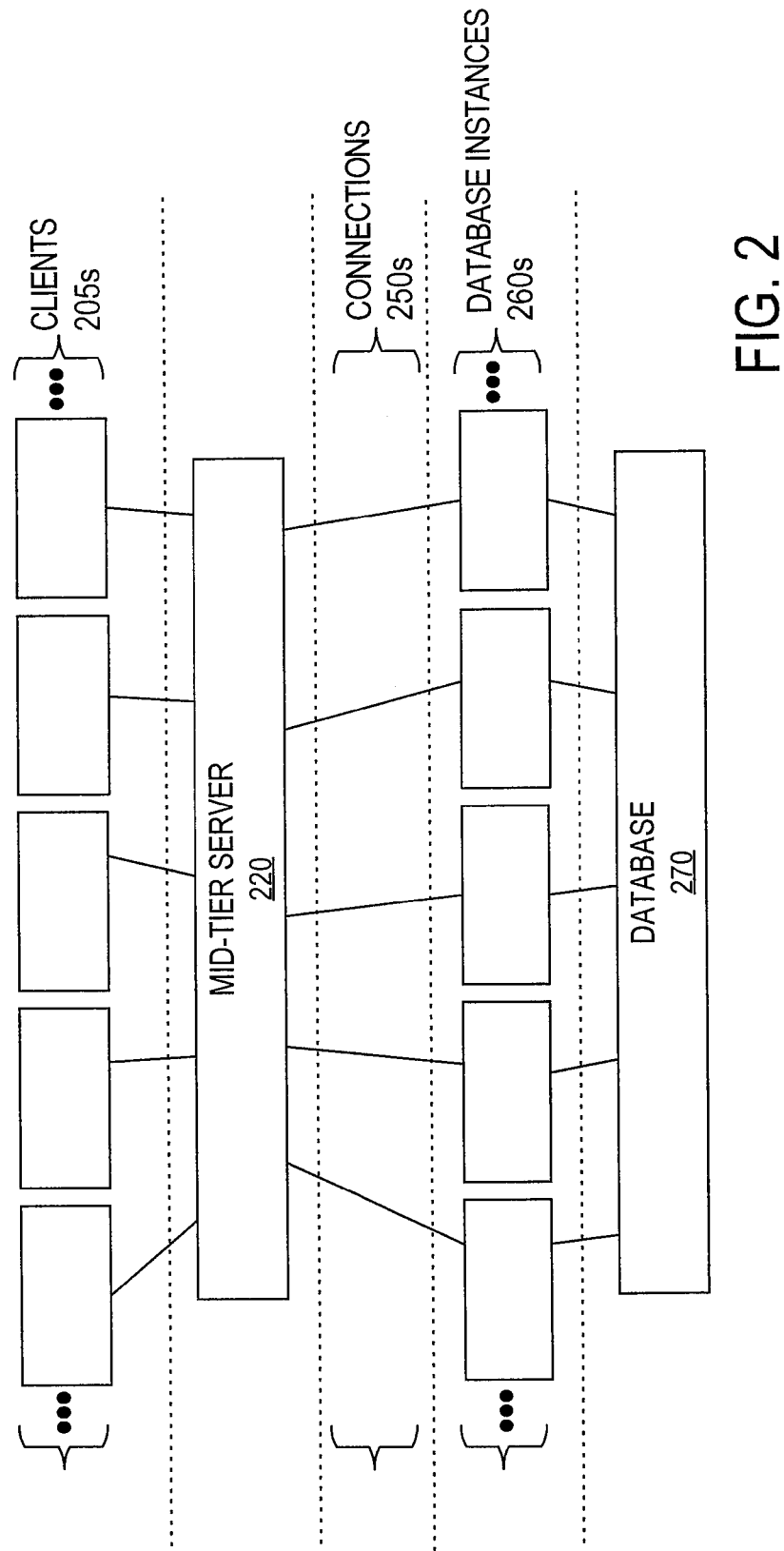
FIG. 2 is a diagram illustrating a system in which client requests are routed to database instances for accessing the database.

FIG. 2 is a more general illustration showing how the major elements of the system are connected. As shown, clients 205s, which may include applications and users, are connected to mid-tier server 220. Mid-tier server 220 uses connections 250s to database instances 260s. Database instances 260s access database 270 to process requests. In one embodiment, database 270 is a single database partition of a larger database.

Figure 3:
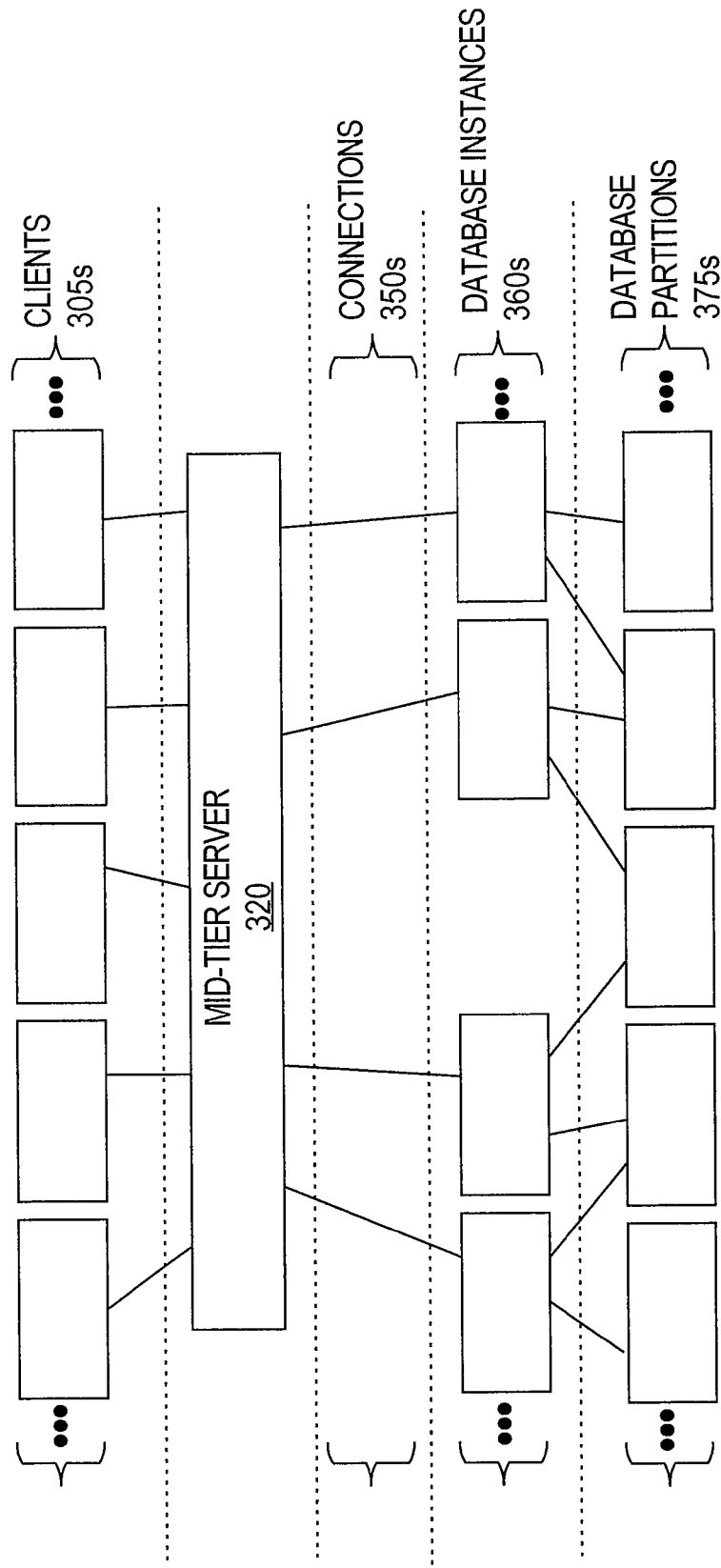
FIG. 3 is a diagram illustrating a system in which client requests for data from a partition of a database are routed to database instances that are configured to access the partition.

FIG. 3 illustrates a variant of the general system described by FIG. 2. In FIG. 3, database instances 360s are each individually configured to access one or more database partitions 375s. A request for one database partition is most efficiently handled by a database instance that is configured to access the database partition. In one embodiment, each database instance is capable of accessing each partition of the database. In another embodiment, one or more database instances may require configuration commands or synchronization commands to be executed before being capable of accessing one or more partitions of the database. In yet another embodiment, some database instances are not capable of accessing some partitions of the database.

Figure 4:
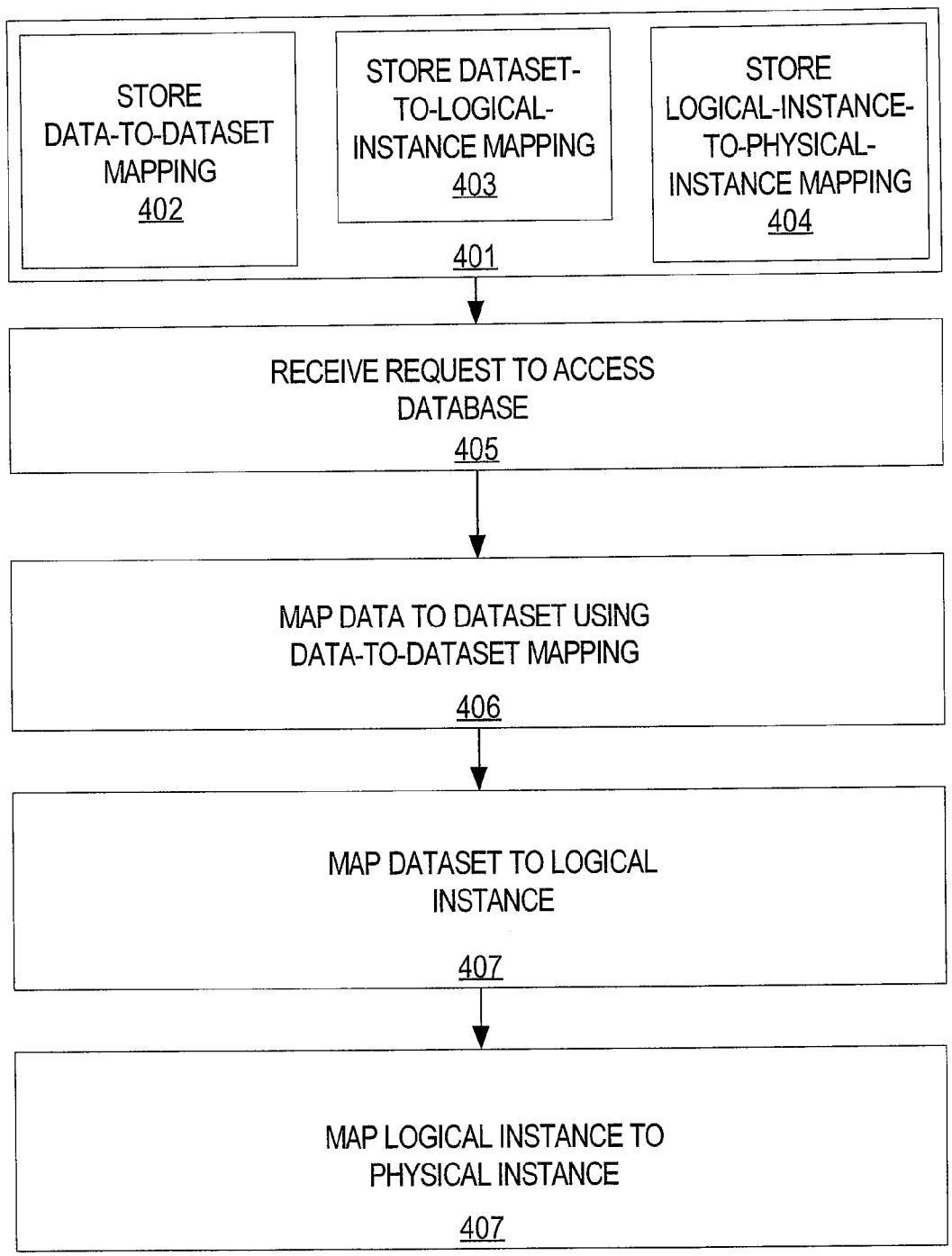
FIG. 4 is a flowchart illustrating a technique for routing a request to a database instance based on a dataset identifier associated with the request and conditions associated with the database instances.

FIG. 4 is a flow diagram showing example steps used by the mid-tier server for affinity-based routing. In step 401, the mid-tier server stores a data-to-dataset mapping in sub-step 402. The mid-tier server also stores a dataset-to-logical-instance mapping in sub-step 403 and a logical-instance-to-physical-instance mapping in sub-step 404. Sub-steps 402-404 may be performed in any order. In one embodiment, sub-steps 403 and 404 are integrated into the same sub-step. In one embodiment, the logical-instance-to-physical-instance mapping is based on the last known availability of one or more database servers. In step 405, the mid-tier server receives a request from a client to access a database. In step 406, the mid-tier server determines which dataset identifier is associated with the request. In step 407, the mid-tier server selects a logical instance to process the request based on the dataset-to-logical-instance mapping. Finally at step 408, the mid-tier uses separate advice, for example advice about server conditions from the servers, to map the logical instance to physical instance.

Example Dynamic Dataset to Server Mapping

The dynamic dataset-to-database-server mapping may be any type of mapping that maps datasets to database servers in a deterministic manner that varies based on one or more last known or current conditions of one or more database server. An example mapping is provided herein to describe a specific implementation.

In one embodiment, an array is initialized with a number of bits equaling the maximum number of possible database servers that can publish a service. For example, an array is established with 128 bits. In another embodiment, the array is initialized with a number of bits equal to double, or some other multiplier, of the number of database servers currently supported by a service, for example 16. Initially, all 16 bits are marked as 0, or "DOWN." A dataset-to-logical-instance mapping, for example "x MOD 16," is sent to the mid-tier servers. A logical-instance-to-physical-instance mapping, for example "0 0 0 0 0 0 0 0 0 0 0 0 0 0 0 0," is also sent to the mid-tier servers. As the advisory engine receives notifications about conditions of database servers currently supporting the service, the advisory engine assigns each database server to a unique bit and updates the bit. In one embodiment, the advisory engine stores a mapping of database server names to bit numbers. For example, if a fifth and seventh database servers are updated to "UP," then the advisory engine updates the fifth bit and the seventh bit to 1. The advisory engine sends an updated logical-instance-to-physical-instance mapping, for example "0 0 0 0 1 0 1 0 0 0 0 0 0 0 0 0" to the mid-tier servers.

When a mid-tier server receives a request, the mid-tier server determines a dataset identifier, for example, 19, associated with the request. The mid-tier server calculates the logical instance according to the dataset-to-logical-instance mapping. For example, the dataset identifier, 19, modulo the number of bits, 16, results in a possible database server of 3. If the possible database server is associated with a bit set to 1, or "UP," in the logical-instance-to-physical-instance mapping, then the mid-tier server uses the possible database server as the selected database server. If the possible database server is associated with a bit with a value of 0, or "DOWN," then the mid-tier server finds another possible database server with a non-zero bit according to the mapping. In one example, the mapping may specify that bits are examined to the right of the initial bit until the next non-zero bit is found. Because the fourth bit is 0 and the fifth bit is 1, the mid-tier server selects the fifth database server to process the request.

If new database servers come up, then the number of bits can be updated to accommodate for the number of database servers. For example, the number of bits may be doubled. In one embodiment, extra bits are kept available in the mapping so that new database servers may be added to the system without a re-mapping. In one example, an extra bit unassigned to a database server remains 0 until an online database server is mapped to the extra bit.

In another embodiment, instead of using a modulo algorithm, the dataset-to-logical-instance mapping uses a bucket algorithm with a percentage allocation of datasets to buckets based on runtime load balancing advice. The examples provided herein are not intended to limit the techniques provided to any particular mapping of datasets to logical instances.

Tuning Affinity-Based Routing

Data access statistics, demand for data, conditions and characteristics of the database servers may be monitored by the advisory engine for tuning and adjusting the data-to-dataset mappings, the dataset-to-logical-instance mappings, and the logical-instance-to-physical-instance mappings. In one embodiment, the frequency of local cache hits in database servers may be monitored. Optionally, a database administrator or other user may be signaled if there is a significant variation in cache hits, misses, and/or response time, or when cache hits, misses, and/or response times do not satisfy a threshold value. In one example, the automated advisory engine detects a significant variation in cache hits and misses, or some other condition, characteristic, resource usage statistic, or data usage statistic, and automatically changes the mappings to accommodate for the variation. For example, the affinity advisory is automatically triggered when service response times are unbalanced, when the demand on data sets exceeds the capacity of any one server to deliver good response times, when some servers are under utilized, or when a percentage of cache misses reaches or exceeds a threshold by way of examples. Such events may cause the advisory engine to restructure the data-to-dataset mappings so that data frequently accessed in the same session appears in the same dataset, and the dataset-to-logical-database-server mappings to better balance the load across database servers.

In one embodiment, the automated advisory engine monitors the system and adjusts the mappings such that transactions associated with similar data flow to a database server consistently until the database server either fails or becomes too loaded to efficiently handle additional requests. Under failure or heavy load conditions, work moves away from the database server in a consistent, reliable, and deterministic manner as specified by the mappings. When the database server becomes available again, the work flows back to the database server according to the mappings.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
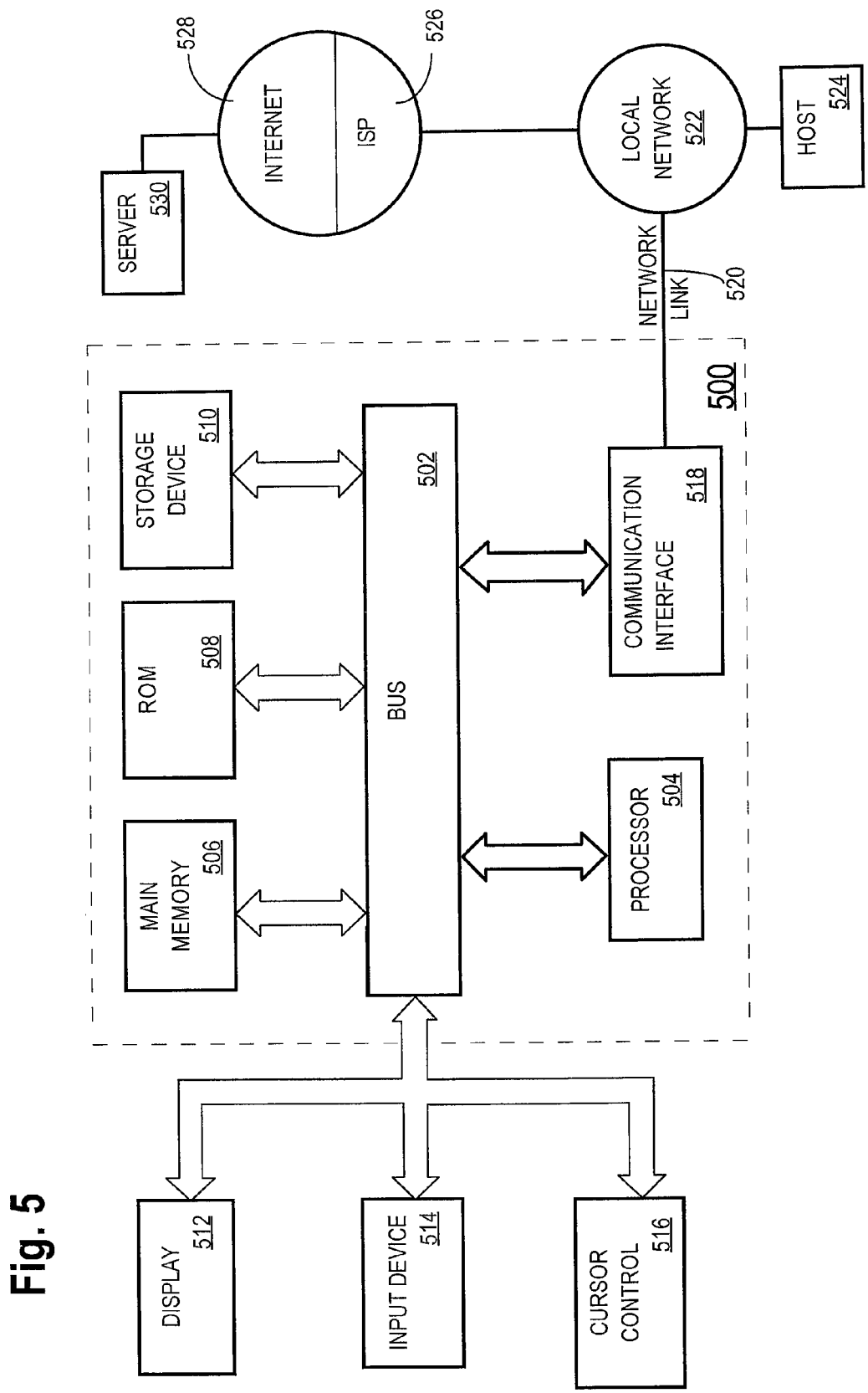
FIG. 5 is a diagram of a computer system upon which the techniques described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory storage media storing instructions which, when executed by one or more computing devices, cause:
    causing mappings to be stored for use by one or more mid-tier servers that provide connections to database servers, the mappings comprising:
        a data-to-dataset mapping that maps first requests associated with data having one or more first key values to one or more first datasets and other requests associated with other data having one or more other key values to one or more other datasets,
        a first dataset-to-candidate-physical-database-server mapping that maps the one or more first datasets to a first candidate physical database server and the one or more other datasets to one or more other candidate physical database servers, and
        a candidate-physical-database-server-to-physical-database-server mapping that maps the first candidate physical database server to a first physical database server and the one or more other candidate physical database servers to one or more other physical database servers;
    wherein when, based on a change in one or more conditions of the first candidate physical database server after causing the mappings to be stored for use, the first candidate physical database server does not satisfy stored criteria, one or more of the first requests, which are mapped to the first candidate physical database server, are caused to be routed to a first other physical database server, and
    when a second candidate physical database server does not satisfy the stored criteria, one or more second requests, which are mapped to the second candidate physical database server, are caused to be routed to a second other physical database server;

wherein the second candidate physical database server is different from the first candidate physical database server;

receiving information that indicates a change of at least one of a condition or a characteristic of one or more physical database servers;

using the information to automatically generate a second dataset-to-candidate-physical-database-server mapping that is different from the first dataset-to-candidate-physical-database-server mapping, wherein the second dataset-to-candidate-physical-database-server mapping maps at least one of the first one or more datasets to the second candidate physical database server;

causing the one or more mid-tier servers to use the second dataset-to-candidate-physical-database-server mapping instead of the first dataset-to-candidate-physical-database-server mapping.

2. The one or more storage media as recited in claim 1, wherein the first dataset-to-candidate-physical-database-server mapping was generated based at least in part on a past response time of the one or more physical database servers, wherein the information comprises an updated response time, and wherein the second dataset-to-candidate-physical-database-server mapping is based at least in part on the updated response time.

3. The one or more storage media as recited in claim 1, wherein the first dataset-to-candidate-physical-database-server mapping was generated based at least in part on at least one of a past load or past availability of the one or more physical database servers, wherein the information comprises an updated load or an updated availability, and wherein the second dataset-to-candidate-physical-database-server mapping is based at least in part on the at least one of the updated load or the updated availability.

4. The one or more storage media as recited in claim 1, wherein the first dataset-to-candidate physical-database-server mapping was generated based at least in part on at least one of a past cache miss rate or a past cache hit rate of the one or more physical database servers, wherein the information comprises an updated cache miss rate or an updated cache hit rate, and wherein the second dataset-to-candidate-physical-database-server mapping is based at least in part on the at least one of the updated cache miss rate or the updated cache hit rate.

5. The one or more storage media as recited in claim 1, wherein the first dataset-to-candidate-physical-database-server mapping, when generated, was not based on a particular characteristic of the one or more physical database servers, wherein the information comprises the particular characteristic, and wherein the second dataset-to-candidate-physical-database-server mapping is based at least in part on the particular characteristic.

6. The one or more storage media as recited in claim 1, wherein the instructions, when executed by the one or more computing devices, further cause detecting that the at least one of the condition or the characteristic satisfies a threshold, and wherein the performance of using the information to automatically generate the second dataset-to-candidate-physical-database-server mapping is in response to the performance of detecting.

7. The one or more storage media as recited in claim 1, wherein the performance of using the information to automatically generate the second dataset-to-candidate-physical-database-server mapping that is different from the first dataset-to-candidate-physical-database-server mapping comprises performance of restructuring the first dataset-to-candidate-physical-database-server mapping, based at least in part on the information, to balance load across a plurality of physical database servers that include the one or more physical database servers.

8. The one or more storage media as recited in claim 1, wherein the information is first information, wherein the data-to-dataset mapping comprises a first data-to-dataset mapping, and wherein the instructions, when executed by the one or more computing devices, further cause:

receiving second information that indicates at least one of a change to a pattern of data access or a demand for data; and using the second information to automatically generate a second data-to-dataset mapping that is different from the first data-to-dataset mapping.

9. One or more non-transitory storage media storing instructions which, when executed by one or more computing devices, cause:

storing a first mapping of data to respective datasets, a second mapping of datasets to respective candidate physical database servers, and a third mapping of candidate physical database servers to respective physical database servers, wherein the first mapping maps requests associated with data having one or more key values to a one or more particular datasets and other requests associated with other data having one or more other key values to one or more other datasets, wherein the second mapping maps the one or more particular datasets to a particular candidate physical database server and the one or more other datasets to one or more other candidate physical database servers, and wherein the third mapping maps the particular candidate physical database server to a particular physical database server and the one or more other candidate physical database servers to one or more other physical database servers;

at a mid-tier server that routes requests to database servers, receiving a particular request to access a database;

in response to receiving the particular request, routing the particular request to a physical database server by:

mapping the particular request to the particular dataset using the first mapping;

mapping the particular dataset to the particular candidate physical database server using the second mapping;

accessing stored information that indicates the particular candidate physical database server does not satisfy stored criteria;

mapping the particular candidate physical database server to the other physical database server using the third mapping; and wherein when, based on a change in one or more conditions of the particular candidate physical database server after the third mapping is stored, the particular candidate physical database server does not satisfy the stored criteria, the mid-tier server routes the particular request from the particular candidate physical database server to the other physical database server.

10. The one or more storage media as recited in claim 9, wherein the instructions, when executed by the one or more computing devices, further cause:

receiving an update to the first mapping that accounts for at least one of a change to a pattern of data access or a demand for data; and wherein the performance of routing the particular request to the physical database server reflects the update and maps the particular request to a different physical database server than the particular request would be mapped without the update.

11. The one or more storage media as recited in claim 9, wherein the instructions, when executed by the one or more computing devices, further cause:
receiving an update to the second mapping that accounts for at least one of a change of a condition or a characteristic of one or more physical database servers; and
wherein the performance of routing the particular request to the physical database server reflects the update and maps the particular request to a different physical database server than the particular request would be mapped without the update.

12. The one or more storage media as recited in claim 9, wherein the performance of mapping the particular candidate physical database server to the other physical database server is based at least in part on determining that the particular candidate physical database server does not satisfy the stored criteria, wherein the other physical database server is re-mapped to a particular other physical database server, and the re-mapping is repeated until the particular other physical database server satisfies the stored criteria.

13. The one or more storage media as recited in claim 9, wherein the performance of mapping the particular dataset to the particular candidate physical database server using the second mapping maps the particular dataset to a bit in a bitmap that represents one or more conditions of the physical database servers, wherein the bit is associated with the particular candidate physical database server; and wherein the performance of mapping the particular candidate physical database server to the other physical database server using the third mapping re-maps the particular candidate physical database server to the other physical database server if the bit indicates that the particular candidate physical database server does not satisfy the stored criteria.

14. The one or more storage media as recited in claim 9, wherein the instructions, when executed by the one or more computing devices, further cause providing an interface to specify a data key at connection checkout.

15. The one or more storage media as recited in claim 9, wherein the performance of mapping the particular request to the particular dataset using the first mapping scans the particular request for data keys and uses the data keys in a rank order specified by the first mapping.

16. The one or more storage media as recited in claim 9, wherein the performance of mapping the particular request to the particular dataset using the first mapping uses a property of the particular request as a data key to identify the particular dataset, wherein the property comprises at least one of a network domain, a client identifier, or a username.

17. A method comprising:
causing mappings to be stored for use by one or more mid-tier servers that provide connections to database servers, the mappings comprising:
a data-to-dataset mapping that maps first requests associated with data having one or more first key values to a one or more first datasets and other requests associated with other data having one or more other key values to one or more other datasets,
a first dataset-to-candidate-physical-database-server mapping that maps a first the one or more first datasets to a first candidate physical database server and the one or more other datasets to one or more other candidate physical database servers, and
a candidate-physical-database-server-to-physical-database-server mapping that maps the first candidate physical database server to a first physical database server and the one or more other candidate physical database servers to one or more other physical database servers;
wherein when, based on a change in one or more conditions of the first candidate physical database server after causing the mappings to be stored for use, the first candidate physical database server does not satisfy stored criteria, one or more of the first requests, which are mapped to the first candidate physical database server, are caused to be routed to a first other physical database server, and
when a second candidate physical database server does not satisfy the stored criteria, one or more second requests, which are mapped to the second candidate physical database server, are caused to be routed to a second other physical database server;
wherein the second candidate physical database server is different from the first candidate physical database server;
receiving information that indicates a change of at least one of a condition or a characteristic of one or more physical database servers;
using the information to automatically generate a second dataset-to-candidate-physical-database-server mapping that is different from the first dataset-to-candidate-physical-database-server mapping, wherein the second dataset-to-candidate-physical-database-server mapping maps at least one of the first one or more datasets to the second candidate physical database server;
causing the one or more mid-tier servers to use the second dataset-to-candidate-physical-database-server mapping instead of the first dataset-to-candidate-physical-database-server mapping;
wherein the method is performed by one or more computing devices.

18. The method as recited in claim 17, wherein the first dataset-to-candidate-physical-database-server mapping was generated based at least in part on a past response time of the one or more physical database servers, wherein the information comprises an updated response time, and wherein the second dataset-to-candidate-physical-database-server mapping is based at least in part on the updated response time.

19. The method as recited in claim 17, wherein the first dataset-to-candidate-physical-database-server mapping was generated based at least in part on at least one of a past load or past availability of the one or more physical database servers, wherein the information comprises an updated load or an updated availability, and wherein the second dataset-to-candidate-physical-database-server mapping is based at least in part on the at least one of the updated load or the updated availability.

20. The method as recited in claim 17, wherein the first dataset-to-candidate physical-database-server mapping was generated based at least in part on at least one of a past cache miss rate or a past cache hit rate of the one or more physical database servers, wherein the information comprises an updated cache miss rate or an updated cache hit rate, and wherein the second dataset-to-candidate-physical-database-server mapping is based at least in part on the at least one of the updated cache miss rate or the updated cache hit rate.

21. The method as recited in claim 17, wherein the first dataset-to-candidate-physical-database-server mapping, when generated, was not based on a particular characteristic of the one or more physical database servers, wherein the information comprises the particular characteristic, and wherein the second dataset-to-candidate-physical-database-server mapping is based at least in part on the particular characteristic.

22. The method as recited in claim 17, further comprising detecting that the at least one of the condition or the characteristic satisfies a threshold, and wherein the performance of using the information to automatically generate the second dataset-to-candidate-physical-database-server mapping is in response to the performance of detecting.

23. The method as recited in claim 17, wherein the performance of using the information to automatically generate the second dataset-to-candidate-physical-database-server mapping that is different from the first dataset-to-candidate-physical-database-server mapping comprises performance of restructuring the first dataset-to-candidate-physical-database-server mapping, based at least in part on the information, to balance load across a plurality of physical database servers that include the one or more physical database servers.

24. The method as recited in claim 17, wherein the information is first information, wherein the data-to-dataset mapping comprises a first data-to-dataset mapping, the method further comprising:
receiving second information that indicates at least one of a change to a pattern of data access or a demand for data; and
using the second information to automatically generate a second data-to-dataset mapping that is different from the first data-to-dataset mapping.

25. A method comprising:
storing a first mapping of data to respective datasets, a second mapping of datasets to respective candidate physical database servers, and a third mapping of candidate physical database servers to respective physical database servers,
wherein the first mapping maps requests associated with data having one or more key values to a one or more particular datasets and other requests associated with other data having one or more other key values to one or more other datasets,
wherein the second mapping maps the one or more particular datasets to a particular candidate physical database server and the one or more other datasets to one or more other candidate physical database servers, and
wherein the third mapping maps the particular candidate physical database server to a particular physical database server and the one or more other candidate physical database servers to one or more other physical database servers;
at a mid-tier server that routes requests to database servers, receiving a particular request to access a database;
in response to receiving the particular request, routing the particular request to a physical database server by:
mapping the particular request to the particular dataset using the first mapping;
mapping the particular dataset to the particular candidate physical database server using the second mapping;
accessing stored information that indicates the particular candidate physical database server does not satisfy stored criteria;
mapping the particular candidate physical database server to the other physical database server using the third mapping; and
wherein when, based on a change in one or more conditions of the particular candidate physical database server after the third mapping is stored, the particular candidate physical database server does not satisfy the stored criteria, the mid-tier server routes the particular request from the particular candidate physical database server to the other physical database server;
wherein the method is performed by one or more computing devices.

26. The method as recited in claim 25, further comprising:
receiving an update to the first mapping that accounts for at least one of a change to a pattern of data access or a demand for data; and
wherein the performance of routing the particular request to the physical database server reflects the update and maps the particular request to a different physical database server than the particular request would be mapped without the update.

27. The method as recited in claim 25, further comprising:
receiving an update to the second mapping that accounts for at least one of a change of a condition or a characteristic of one or more physical database servers; and
wherein the performance of routing the particular request to the physical database server reflects the update and maps the particular request to a different physical database server than the particular request would be mapped without the update.

28. The method as recited in claim 25, wherein the performance of mapping the particular candidate physical database server to the other physical database server is based at least in part on determining that the particular candidate physical database server does not satisfy the stored criteria, wherein the other physical database server is re-mapped to a particular other physical database server, and the re-mapping is repeated until the particular other physical database server satisfies the stored criteria.

29. The method as recited in claim 25, wherein the performance of mapping the particular dataset to the particular candidate physical database server using the second mapping maps the particular dataset to a bit in a bitmap that represents one or more conditions of the physical database servers, wherein the bit is associated with the particular candidate physical database server; and wherein the performance of mapping the particular candidate physical database server to the other physical database server using the third mapping re-maps the particular candidate physical database server to the other physical database server if the bit indicates that the particular candidate physical database server does not satisfy the stored criteria.

30. The method as recited in claim 25, further comprising providing an interface to specify a data key at connection checkout.

31. The method as recited in claim 25, wherein the performance of mapping the particular request to the particular dataset using the first mapping scans the particular request for data keys and uses the data keys in a rank order specified by the first mapping.

32. The method as recited in claim 25, wherein the performance of mapping the particular request to the particular dataset using the first mapping uses a property of the particular request as a data key to identify the particular dataset, wherein the property comprises at least one of a network domain, a client identifier, or a username.

* * * * *